US008645007B2

(12) United States Patent
Gölling et al.

(10) Patent No.: US 8,645,007 B2
(45) Date of Patent: Feb. 4, 2014

(54) AIRCRAFT WITH AN ARRANGEMENT OF FLOW-INFLUENCING DEVICES

(75) Inventors: Burkhard Gölling, Buchholz i.d.N (DE); Rudibert King, Hohen-Nenendorf (DE); Ulrich Notger Heinz, Berlin (DE); Wolfgang Nitsche, Gollenberg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/491,629

(22) Filed: Jun. 8, 2012

(65) Prior Publication Data

US 2013/0166110 A1    Jun. 27, 2013

Related U.S. Application Data

(63) Continuation of application No. PCT/EP2010/007470, filed on Dec. 8, 2010.

(60) Provisional application No. 61/267,514, filed on Dec. 8, 2009.

(30) Foreign Application Priority Data

Dec. 8, 2009   (DE) .......................... 10 2009 057 405

(51) Int. Cl.
*B64C 19/00* (2006.01)
(52) U.S. Cl.
USPC ........... 701/3; 701/8; 701/10; 701/11; 701/14
(58) Field of Classification Search
USPC ........... 701/3–8, 10–14; 244/200, 200.1, 204, 244/204.1, 207–209, 130
See application file for complete search history.

(56) References Cited

U.S. PATENT DOCUMENTS

| 4,516,747 A | 5/1985 | Lurz |
| 6,234,751 B1 | 5/2001 | Hassan et al. |
| 6,375,118 B1 * | 4/2002 | Kibens et al. ............... 244/53 R |

(Continued)

FOREIGN PATENT DOCUMENTS

| EP | 0 743 242 | 11/1996 |
| GB | 2 263 525 A | 7/1993 |

OTHER PUBLICATIONS

International Search Report for Application Serial No. WO 2011/069650 dated Mar. 17, 2011.

(Continued)

*Primary Examiner* — Richard Camby
(74) *Attorney, Agent, or Firm* — Jenkins, Wilson, Taylor & Hunt, P.A.

(57) ABSTRACT

An aircraft, which has a respective arrangement of flow-influencing devices in at least one surface segment of each wing extending in the wingspan direction in order to influence the fluid flow over the surface segment, and of flow condition sensor devices for measuring the flow condition on the respective segment, and a flight control device, wherein the flight control device has a flow-influencing target parameter setting device connected with the arrangement of flow-influencing devices for generating target parameters for the flow-influencing devices of the at least one surface segment, wherein the flow-influencing devices are designed in such a way as to use the target parameters to change the local lift coefficients or correlations between the drag and lift coefficients in the segment where respectively located.

9 Claims, 2 Drawing Sheets

(56) References Cited

U.S. PATENT DOCUMENTS 6,464,167 B2 * 10/2002 Hayes .............................. 244/15
6,866,234 B1 * 3/2005 Hassan et al. ................. 244/208
7,021,587 B1    4/2006  Younkin

OTHER PUBLICATIONS

German Office Action for Application No. 10 2009 057 405.0 dated Apr. 23, 2013.

* cited by examiner

AIRCRAFT WITH AN ARRANGEMENT OF FLOW-INFLUENCING DEVICES

CROSS-REFERENCE TO RELATED APPLICATIONS

The present application is a continuation of International Application No. PCT/EP2010/007470, filed on Dec. 8, 2010, which claims priority from German Application DE 10 2009 057 405.0, filed on Dec. 8, 2009, and claims the benefit of U.S. Provisional application 61/267,514, filed on Dec. 8, 2009, each of which is hereby incorporated in its entirety by reference.

FIELD OF THE INVENTION

The invention relates to an aircraft with an arrangement of flow-influencing devices.

BACKGROUND

Known from prior art are the flow-influencing devices integrated into the aerofoils of an aircraft, with which given local aerodynamic flow conditions on segments of the aerofoil are to be stabilized. It can here be provided in particular to reduce turbulences on the aerofoil, to prevent the local lift coefficient from being reduced by the formation a locally turbulent flow in critical stages of flight.

SUMMARY

Various embodiments of the invention provide measures with which the aerodynamic performance of controlled aircraft can be increased.

Various embodiments of the invention provide an aircraft that has a respective arrangement of flow-influencing devices in at least one surface segment of each wing extending in the wingspan direction in order to influence the fluid flow over the surface segment, and of flow condition sensor devices for measuring the flow condition on the respective segment, and a flight control device, wherein the flight control device has a flow-influencing target parameter setting device connected with the arrangement of flow-influencing devices for generating target parameters for the flow-influencing devices of the at least one surface segment, wherein the flow-influencing devices are designed in such a way as to use the target parameters to change the local lift coefficients or correlations between the drag and lift coefficients in the segment where respectively located.

The advantages achievable with various embodiments of the invention involve the following aspects:

Improved agility of flight objects in order to fly through transient and/or unsteady flight conditions in a controlled manner;

Increased performance of flight objects and their viability;

Ability of the aircraft to perform a short, controlled takeoff and landing;

Suppressed influence of gusts, strong ascending currents and descending currents, or turbulence and other unsteady flow conditions;

Expanded potential flight range with respect to angle of incidence given a specific, desired lift, drag or lift/drag ratio;

Incorporation in aircraft design enables a reduced technical outlay and weight of trailing edge devices or trailing edge flaps for high lift, and hence a reduced fairing and lower flow resistance and better lift on the trailing edge device owing to unimpeded leakage flow;

Improved layout of wing profile in terms of sliding properties at cruising altitude, wherein less attention need be focused on high lift, since the latter is covered by the described invention;

Increased efficiency of control surfaces, making it possible to use smaller control surfaces or a more agile flight behavior;

Approach speeds are lowered for approach, i.e., shorter landing strips are needed for the same aircraft sizes.

In addition, various embodiments of the invention enable approach procedures for an aircraft that will take place at a constant, high gliding angle given a variation of the angle of incidence without a thrust correction by controlling the lift coefficient in conjunction with the drag coefficient through adjustment of the separation depth on the trailing edge flap by setting the variable volume/mass flow of the flow control system.

One application of an embodiment of the invention allows in-flight fueling, provided the lift coefficient is regulated during the fueling process in order to uniformly use a mass increase of the one aircraft and a mass decrease of the other aircraft by autonomously adjusting the separation depth on the trailing edge flap or setting the variable volume/mass flow of the flow control system.

Various embodiments of the invention further enable an improved development of flight operating modes ("design to flight procedures"): adjustment of the lift coefficient or drag coefficient necessary for the flight condition of the desired flight procedure by regulating the volume mass flow, i.e., via regulation to a target variable, e.g., the lift coefficient, by varying the volume flow, which realizes the disruptive flow with the given structural dimensions of the flow control system and the boundary conditions relative to integration of the actuator system into the system According to various embodiments of the invention, gusts, strong updrafts and downdrafts or turbulences and other unsteady inflow conditions can be suppressed by influencing the flow over the trailing edge flap, so that lift can be ensured by adjusting the separation depth or separation degree.

According to various embodiments of the invention, the flow-influencing target parameter setting device can have a control input device, which when actuated generates the target parameters, or an autopilot device, which uses a preset operating mode to generate the target parameters, e.g., for the continuous-path control of the aircraft on a prescribed desired path.

The aircraft according to various embodiments of the invention can here be designed in such a way that the flight control device is configured as a flight condition control device, or has one, along with a flow condition control device. The flight condition control device is designed in such a way as to use the target parameters of the flow-influencing target parameter setting device and sensor signals of the flight condition sensor device to transmit input signals to the flow condition control device functionally connected with the flight control device. In addition, the flow condition control device can be designed in such a way as to use the input signals of the flight condition control device and sensor signals of the flow condition sensor device of each segment to generate flow condition adjustment commands for actuating the flow-influencing device of each segment, and transmit them to the flow-influencing device of each segment, in order to control the aircraft based on the target parameters of the flow-influencing target parameter setting device.

It can here be provided that the flight condition control device have a segment actuation function designed in such a way as to relay these adjustment commands to the flow-influencing device of each segment and/or the adjustment commands to the actuator based on the adjustment signals of the flight condition control device based on an optimization taking into account the power and/or dynamics of the flow-influencing device and/or the actuator of the adjustment flap available at the time in question.

It can be provided according to various embodiments of the invention that the arrangement of flow-influencing devices include the following: exhaust openings situated in one segment or several segments, and a flow generating device situated in the wing for purging and/or siphoning purposes, through which the fluid is purged or siphoned out of the exhaust openings, so as to influence the lift coefficient arising locally on the segment.

It can here be further provided that the arrangement of flow-influencing devices additionally have suction openings situated in one segment or several segments, and a suction device situated in the wing and connected in terms of flow with the suction openings, through which fluid is aspirated from the suction openings, so as to influence the lift coefficient arising locally on the segment.

According to various embodiments of the invention, the arrangement of flow-influencing devices can include loudspeaker devices, which are situated in one segment or several segments, and when activated can influence the lift coefficient arising locally on the segment by generating air fluctuations.

Alternatively or additionally, the arrangement of flow-influencing devices can include piezo-actuators situated on the surface of the wing, which are arranged in one segment or several segments, and when activated can influence the lift coefficient arising locally on the segment by generating air fluctuations.

The arrangement of flow-influencing devices can here also have an adjustment flap and an actuator for regulating the latter, wherein the target parameters for the flow-influencing devices include target parameters for the flow-generating device and target parameters for an actuator for regulating the adjustment flap.

According to various embodiments of the invention, the at least one segment can include several segments, which are situated one in back of the other viewed in the wingspan direction of the wing.

The flow condition setpoint entry can generally include a wing load distribution device or function that uses an aircraft-related condition to ascertain a setpoint load distribution on the wing in the form of the flow value related to one respective segment as the setpoint value with which a prescribed load distribution is set on the aerofoils.

Alternatively or additionally, the flow condition setpoint entry can generally include a gust ameliorating function, which uses an aircraft-related condition to ascertain a required change in the lift coefficient on the respective segment. The gust ameliorating device or function of the flight control device is designed to generate target parameters, which compensate for the unsteady loads on the aerofoils caused by gusts. In particular as input variables, the gust-ameliorating device can here ascertain acceleration variables and/or rotating rate variables from the flight position sensor device (inertial measurement unit, "IMU") and/or inertial sensors as well as acceleration variables and/or rotating rate variables of sensor devices locally situated at suitable locations in the wing and/or fuselage.

BRIEF DESCRIPTION OF THE DRAWINGS

In the following, embodiments of the invention will be described based on the attached figures, which show.

Components and functions with the same or similar function on the figures are labeled with the same reference number.

DESCRIPTION

Figure 1:
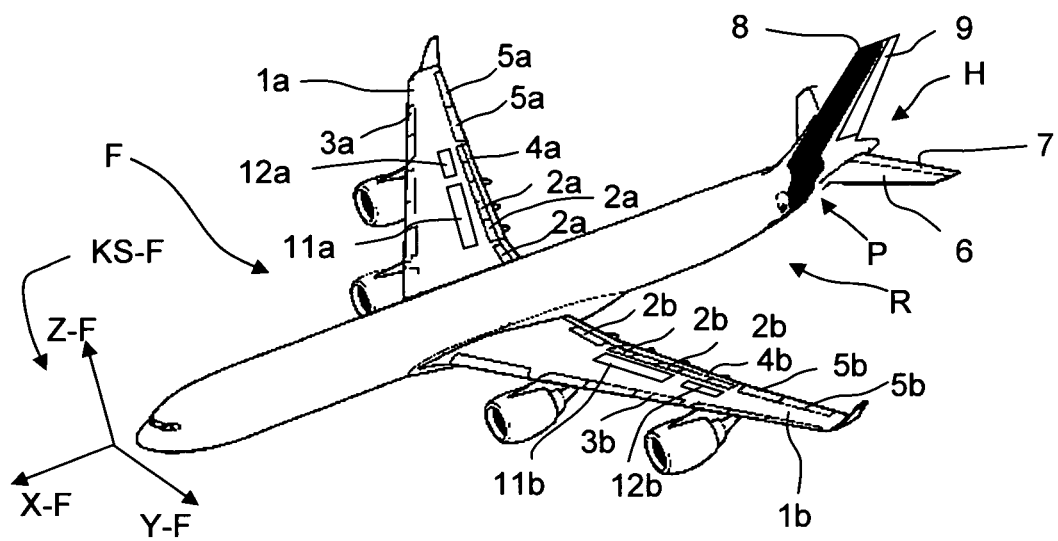
FIG. 1 a perspective view of an aircraft, which integrates the flow-influencing device provided according to an embodiment of the invention.
Figure 2:
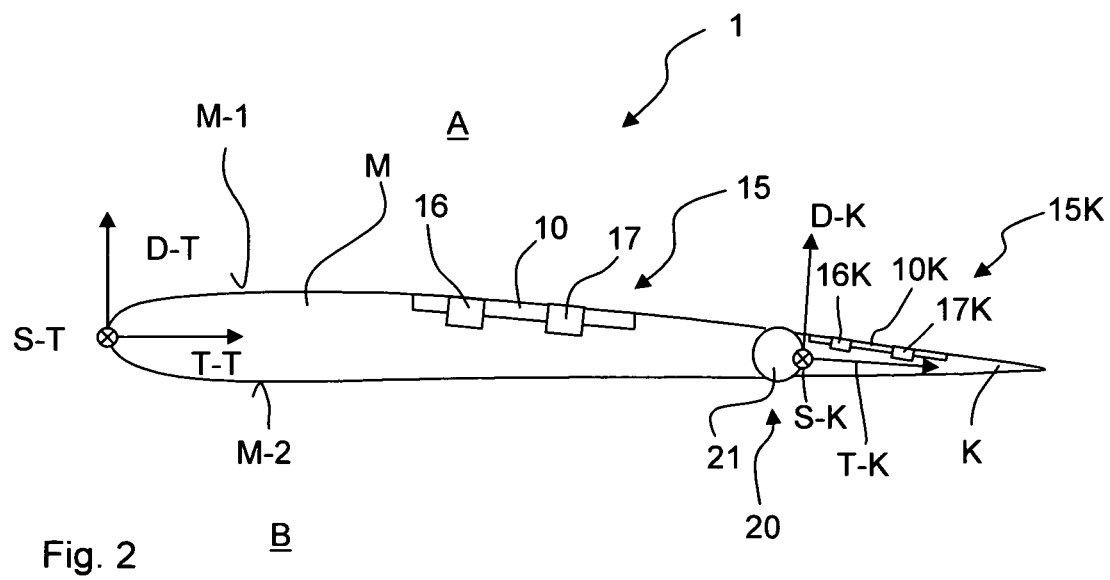
FIG. 2 is a diagrammatic view of the cross section of a aerofoil with an arrangement of flow-influencing devices and flow-condition sensors provided according to an embodiment of the invention in at least one segment of the latter, along with an optionally provided adjustment flap, which can be regulated from an adjustment device with an actuator.

The example embodiment of a controlled aircraft F shown on FIG. 1 in which use can be made of various embodiments of the invention has the customary configuration of two aerofoils $1a$, $1b$, each with at least one aileron $5a$ or $5b$. The aircraft depicted on FIG. 1 further has three leading edge lift devices $3a$, $3b$ and three trailing edge lift devices $4a$, $4b$ on each respective aerofoil $10a$, $10b$. As an option, the aerofoils $1a$, $1b$ can each have a plurality of spoilers not shown on FIG. 1. In FIG. 1 a KS-F coordinate system is inserted relating to the aircraft F, with a longitudinal aircraft axis X-F, a lateral aircraft axis Y-F, and a yaw aircraft axis Z-F. Each aerofoil $1a$, $1b$ can have allocated to it a aerofoil coordinate system KS-T with an axis S-T for the wingspan direction, an axis T-T for the chord direction and an axis D-T for the thickness direction of the aerofoil (FIG. 2). The aircraft F further has a rear tail assembly H with a rudder unit 8 having a rudder 9, and an elevator unit 6 having at least one elevator rudder 7. For example, the elevator unit 6 can be designed like a T-shaped tail unit of the kind depicted on FIG. 1, or like a cross tail unit.

The aircraft F according to an embodiment of the invention can also have another shape, with the adjustment flaps arranged differently than in the aircraft F depicted on FIG. 1.

In order to further explain the invention, FIG. 2 diagrammatically depicts a main wing 10 having an adjustment flap K coupled with the main wing M. According to an embodiment of the invention, the aerodynamic body can be the adjustment flap K, i.e., an aerodynamic body adjustably secured to the aircraft, e.g., an adjusting flap of the kind shown on FIG. 1, meaning a high lift flap, a transverse rudder, a spoiler, an elevator or rudder. In particular, the aerodynamic body provided according to an embodiment of the invention can also be a main wing M. The main wing M has an upper side M-1 running on its suction side A, a lower side M-2 running on the pressure side B of the latter, and if necessary, a rear side facing the high lift flap K. A flap chord direction T-K or general chord direction, a wingspan direction S-K or general wingspan direction, and a flap thickness direction D-K or general flap thickness direction are defined for the high lift flap or generally for the adjustment flap K of the aerodynamic body. The adjustment flap K or high lift flap have an upper side K1 running on the suction side A of the high lift flap K, and a lower side K2 running on the pressure side B of the high lift flap K.

According to various embodiments of the invention, the aerodynamic body has an arrangement consisting of at least one flow-influencing device and at least one flow condition sensor situated on the main wing M and/or a flap K. In FIG. 2, an arrangement 15 including at lest one flow-influencing device 16 and at least one flow condition sensor 17 is situated in a segment 10 on the upper side M-1 of the main wing, and in a segment 10 on the upper side M-1 of the main wing M. Diagrammatically recorded on FIG. 1 on the aerofoils are corresponding segments 11a, 11b, 12a, 12b, which each accommodate a corresponding arrangement 15 including at least one flow-influencing device 22 and at least one flow condition sensor 21. Alternatively or additionally, as also depicted on FIG. 2, such a segment 10K with an arrangement 15K including at least a flow-influencing device 16K and at least one flow condition sensor device 17K can be situated on the upper side K1 (on the suction side of the main wing) or lower side K2 (on the pressure side of the main wing) of the respective adjustment flap K.

The flow-influencing device 16 or 16K is configured in such a way that it can influence the flow applied to the respective surface, and hence the lift coefficient of the main wing M or adjustment flap K.

In particular, the flow-influencing device 16 or 16K can also be used to set the extent to which the flow applied to the respective surface can be influenced. According to one example embodiment, the flow-influencing device 16 or 16K includes an opening (not shown) and flow-generating device or flow conveying drive (not shown), which produce a stream of purged (this means: ejected or blown) or siphoned (this means: ingested or sucked) air through the opening. The flow conveying drive can here be installed or integrated into a channel connected with the opening, and operate at a permanently set power, or the latter can be designed to change or control the inlet pressure and/or purging pressure and/or differential pressure via corresponding actuation using an actuating function.

The flow-influencing device 16 or 16K can alternatively or additionally have a exhaust opening changing device or suction opening changing device, with which the opening of a channel inside the main wing M or adjustment flap K on the surface empties into the environment, wherein the channel ends or exits at another location of the main wing M or adjustment flap K. In this way, the exhaust opening changing device or suction opening changing device can be used to control or adjust the respective amount of air streaming through the opening.

The flow condition sensor device 15 or 15K can have one or more sensors for detecting the flow condition of the flow applied or released on the upper side of the high lift flap. The sensor or several sensors for detecting the flow rate can here include a hot wire sensor. In addition, the sensors or several sensors can include a piezo wall shear stress sensor for detecting the wall shear stress. The sensor or several sensors for detecting the wall shear stress can here be a hot film sensor.

The sensor or the several sensors can generally include a sensor for detecting the properties of the flow condition on the upper side or suction side of the main wing M or flap K, designed in such a way that the flow condition can be conclusively ascertained from the signal generated by the sensor, i.e., it is determined whether an applied or separated flow is present, or can be detected or ascertained.

In addition, it can be provided that the flow condition sensor device 17 or 17K be provided in the mentioned channel inside the flap K, so as to ascertain flow conditions in a channel or several channels in the high lift flap and/or in the main wing by means of a corresponding sensor device, and relay them as flow values to the high lift flap adjustment device to control the flow conditions and change the actuation or control of flow-influencing devices.

The aircraft F has wings 1, 1a, 1b, which, in at least one surface segment 10 of the main wing M extending in the wingspan direction or an adjustment flap K, have an arrangement 15 or 15K of flow-influencing devices 16 or 16K for influencing the at least one fluid flow over the at least one surface segment 10, and of flow condition sensors 17K or 17K for measuring the flow condition on the respective segment. Each aerofoil on FIG. 1 has two such surface segments 11a, 12a or 11b, 12b, of which each exhibits a respective arrangement 15 of flow-influencing devices 16 or 16K and flow condition sensor devices 17 or 17K. The surface segment 10 with the arrangement 15 or 15K of flow-influencing devices 16 or 16K and flow condition sensors 17 or 17K according to an embodiment of the invention can be situated on the upper side and/or lower side of the main wing M and/or the adjustment flap K.

Various embodiments of the invention provide an aircraft with a flight control device and an actuating device or control input device 31 connected with the flight control device for generating control target parameters 31a for controlling the aircraft F. The control input device 31 of the aircraft F usually includes a control input device 31 situated in the cockpit of the aircraft for inputting control parameters relating to flight path control of the aircraft, which in particular can have the pilot entry means, such as a joystick, and optional pedals as well.

In addition, the flight control device can have an operating mode entry device and/or an autopilot 32, which is used for autopilot target parameters 32a for controlling the aircraft F, and functionally connected with the flight control device in order to send it target parameters 31a or 32a.

In response to the control target parameters 31a of the control input device 31 and/or autopilot target parameters 32a of the autopilot 32, target parameters are generated in the flight control device 50 for activating or moving positioners, and in particular the actuator to adjust the flow-influencing devices and/or the actuator or flap drive of the adjustment flaps to be actuated, and relayed or sent to the latter.

The aircraft F further has a flight condition sensor device 40 with an air data sensor device 41 (air data system ADS) functionally connected with the flight control device 50 for acquiring flight condition data to determine the flight condition, as well as a flight position sensor device or inertial sensor device 42 (inertial measurement unit, IMU) to acquire the flight condition of the aircraft F, and in particular the rotating rates of the aircraft F. The air data sensor device 41 has air data sensors for ascertaining the flight condition of the aircraft F, and in particular the dynamic pressure, static pressure and temperature of air flowing around the aircraft F. The flight position sensor device 42 is used in particular to acquire the rotating rates of the aircraft F, including the yaw and roll rates of the aircraft in order to determine the flight position of the latter. The flight controller 50 receives the flight condition sensor signals 40a of the sensor values acquired from the flight condition sensor device 40, and here in particular the air data sensor signals 41a of the air data sensor device 41 and the flight position sensor date 42a from the flight position sensor device 42.

The respective control flaps present on the aircraft, e.g., the rudders 5a, 11b, the spoilers 12a or 12b, have allocated to them at least one positioner and/or drive device, which according to an embodiment of the invention are each optionally actuated by the flight controller 50 via command signals, which are target parameters, in order to adjust the respectively allocated control flaps for controlling the aircraft F. It can here be provided that one of these control flaps have allocated to it a positioner, or to increase the fault tolerance of the aircraft system, a plurality of positioners.

The flight controller 50 in the form of a flight position control device 70 (FIG. 4) has a control function that receives control commands from the control input device 30, and sensor values 40*a* from the sensor device 40. The control function is configured in such a way that it generates adjustment commands for the positioners as a function of the control commands 30*a* and the acquired and received sensor values 40*a*, and relays them to the latter, so that the aircraft F is controlled according to the control commands by actuating the positioners.

Figure 3:
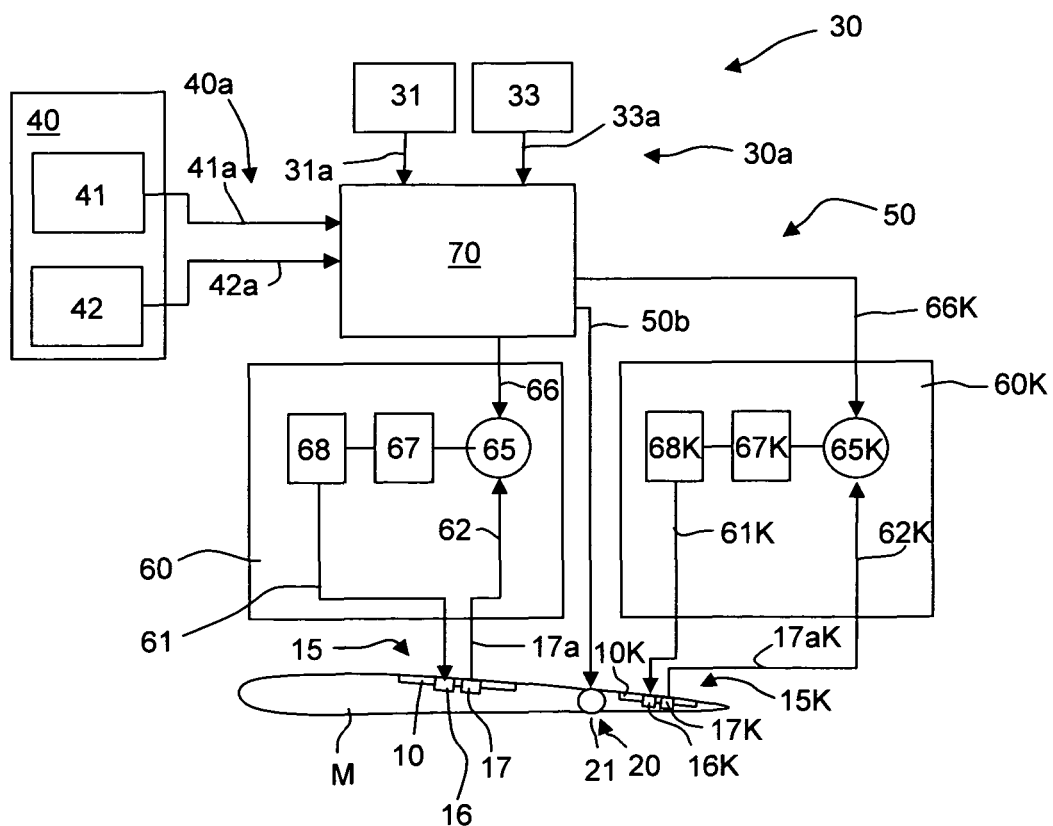
FIG. 3 is an example embodiment of a flight controller provided according to an embodiment of the invention with a flight control device exhibiting a flight condition control device and flow condition control device, wherein flow condition adjustment commands for actuating the flow-influencing device of each segment are generated and transmitted thereto via the flow condition control device based on the input signals of the flight condition control device, and based on the sensor signals of the flow condition sensor device of each segment.

FIG. 3 here shows an embodiment of the invention in which an arrangement 15 or 15K of flow-influencing devices 16 or 16K and flow condition sensors 17 or 17K is situated on the main wing M and the adjustment flap K at one location in the respective wingspan direction.

During flight, the pilot uses the actuating device 31 to generate a setpoint command or a desired command 31*a* for controlling the aircraft. The setpoint command 31*a* for aircraft control can be a three-dimensional acceleration vector for introducing a relative change in the flight position of the aircraft, or a directional change parameter. The setpoint command vector can also include both parameter values combined, and here generate directional change parameters for lateral movement, and acceleration parameters for vertical movement of the aircraft.

It can additionally be provided that target parameters or setpoint command vectors 33*a* are generated via an autopilot 33.

As shown on FIG. 3, the flow-influencing target parameter setting device 30 or flight control device 50 according to an embodiment of the invention generally actuates at least one such positioner, which is present in one segment 10 or 10K on a surface of the aerofoil, optionally alternatively or additionally to the potentially present, at least one adjustment flap K that can be activated by the latter, meaning at least one actuator or flap drive of the at least one activated adjustment flap K. Based on the target parameters 30*a* of the flow-influencing target parameter setting device 30, the flight control device 50 generates flow condition adjustment commands 66 or 66K for activating or moving at least one actuator of the flow-influencing device 15 or 15K of each affected segment 10 or 10K in order to adjust the flow-influencing devices, and optionally also adjustment commands for activating or moving at least one actuator or the flap drive of the adjustment flaps to be activated, and relayed to the latter. By activating or moving the positioners of the flow-influencing devices, the local lift coefficients or correlations between the drag and lift coefficients are changed in a predetermined way in that wingspan region where the segment 10 or 10K with the respectively activated flow-influencing device is located. If there are several segments 10, 10K present in the wingspan direction and/or chord direction of the main wing or the flap K, it can be provided that a segment actuation function be used to offset and consolidate the flow position adjustment commands 66 or 66K on the flow-influencing devices of the respective segments, or respectively determined for a higher-order adjustment command.

For example, in cases where each aerofoil 1*a*, 1*b* has two segments 10 each with an arrangement 15 or 15K of flow-influencing devices and flow condition sensors 22 or 22K and two adjustment flaps K that are provided in a functionally predetermined way to stabilize and/or control the aircraft and/or adjust a flight operating mode, the flow-influencing target parameter setting device 30 or flight control device 50 use the control and regulating algorithms implemented therein to actuate as a function of time the mentioned flow-influencing devices and flap drives of the adjustment flaps for their adjustment, so as to set a flight position according to the target parameters 31*a* and/or 32*a* for controlling the aircraft F or a flight operating mode, and in the process stabilizing the aircraft in a flight position and/or implement a path control motion and/or maintain the load distribution on the aerofoil and/or compensate for gusts.

The aerofoil used according to various embodiments of the invention can also be designed in such a way as to have an adjustment flap, which is functionally connected with the flow-influencing target parameter setting device 30 or flight control device 50 for controlling or stabilizing the aircraft. In this case, the flow-influencing target parameter setting device 30 or flight control device 50 activates flow-influencing devices 15 of at least a aerofoil segment 10. In like manner, embodiments of the invention can be provided such that segments of the surface of at least one adjustment flap accommodate an arrangement 15K of flow-influencing devices 16K and flow condition sensors 17K, which are functionally connected with the flow-influencing target parameter setting device 30 or flight control device 50 as described for controlling or stabilizing the aircraft.

As a result, the controller according to various embodiments of the invention generally has a flow-influencing target parameter setting device 30 with a activation function for generating target parameters to drive devices in order to adjust flow-influencing devices 15 or 15K of at least one surface segment 10 or 10K and/or target parameters to drive devices for adjusting at least one adjustment flap per aerofoil, which based on the target parameters for controlling the aircraft acquires corresponding target parameters for activating adjustment devices on the wings, the activation of which is intended to change or influence the flight condition of the aircraft according to the target parameters.

It can here be provided that the flow-influencing device 16, 16K be supplied as the input value an input value derived from the setpoint command 30*a* of the flow-influencing target parameter setting device 30, which is determined by means of a flight control device 50 based on flight condition sensor data and flow condition sensor data, or a flight condition control device 70 based on flight condition sensor data from the setpoint command 30*a* (reference number 66 in the example embodiment of FIG. 3).

The activation and operation of the at least one actuator of the flow-influencing devices 16 or 16K of one respective segment 10 or 10K can take place in particular based on target parameters 30*a* of the flow-influencing target parameter setting device 30, which are sent to the flow condition regulating device 60, which takes the target parameters 30*a* for each respective segment 10 or 10K of the at least one segment 10 or 10K to generate a flow condition manipulated variable 61 (FIG. 4) for the actuator of the flow-influencing device 16 or 16K of a wing, which corresponds to a local lift coefficient required at a point in time for the region of the respective segment. Based on how the actuator of each respective segment is activated and commanded via the flow condition manipulated variable 61, the respectively activated actuator is operated, as a result of which the respective accompanying flow-influencing devices 15 or 15K influences the flow condition in the aerofoil at the local segment, thereby in particular influencing and changing the flow condition present at the respective segment 10 or 10K.

The flow condition actually present at the respective segment 10 or 10K is acquired via the flow-condition sensor device 16 or 16, and the acquired flow condition actual value is compared as a sensor signal 62 or 62K with the value of an input signal in a comparator device 65 or 65K. The value of the input signal can be the value of the setpoint command 30a generated with the flow-influencing target parameter setting device 30, or derived from it. It can here be provided in particular that the value of the input signal 66 or 66K e ascertained from a setpoint command 30a in a flight condition control device 70.

In the example embodiment shown on FIG. 3, the flight control device 50 is connected with a flight condition sensor device 40 for receiving flight condition sensor signals 40a.

In particular in the example embodiment of FIG. 3, the flight control device 50 can here in particular have a control algorithm that corrects the mentioned input values according to the target parameters 30a received by the latter ("complete control").

The control algorithm of the flight control device 50 and/or the flow condition control device 60 can consist on the one hand of a synthesis of a measure for the lift, drag or lift/drag ratio from sensor data (in particular pressure sensors as the sensor device 17 on the aerofoil or flap K) and on the other hand of a robust control algorithm for achieving a preset target value for the above measure. The controller is supported by an anti-wind-up-reset structure. The measure is obtained from a combination of chronological integration and reference tables, and can be linked one-to-one with a variable relevant to flight, e.g., lift. This indirectly makes it possible to stipulate a lift or lift coefficient, for example, which then is converted into a value for the physical unit or the amount via the algorithm. This specification for the physical unit, hereinafter referred to as setpoint value or calculated value, is used to determine the difference relative to the current physical unit, which then defines the scope and type of control action.

The controller can be developed based on a linear multiple variable black box model, the controller with a procedure for synthesizing robust controllers. When identifying the linear multiple variable black box model, suitable fault signals are generated in the form of sudden changes in the actuation variable, and the response of the physical unit thereto is measured. A linear differential equation system is derived from the dynamic behavior of the response by means of parameter identification methods, and represents the basis for controller synthesis. Numerous different identifications of this kind yield a model family, from which a representative or average model is selected per synthesis. Methods can be used in controller synthesis (e.g., FL-synthesis, robustification, robust LoopShaping). The resultant classic linear control loop can be supported by an anti-wind-up-reset structure, which when prompted for the manipulated variable lying over the realizable manipulated variable corrects the internal states of the controller in such a way that an integration part in the controller does not cause the controller to overshoot or lock up. As a consequence, the controller remains responsive even given an unrealistic request, thus increasing operational safety. It is always adjusted to the current situation, without manifesting any delays brought about by preceding manipulated variable limitations.

The controller can be designed in particular as an optimal controller that receives all necessary input variables as control variables, and after a control process algorithm generates the various output signals for flow-influencing device 16 or 16K and/or actuator 21 or flap drive of the at least one actuated adjustment flap K in a matrix-like procedure, based on calibrations and parameters derived from the latter for allocating control variables and manipulated variables as a function of flight condition variables.

Therefore, a flight-relevant distinctive coefficient (lift, lift coefficient, drag, lift/drag ratio, etc.) is to be determined unsteadily from substitute control variables according to various embodiments of the invention, after which this coefficient is to be used for a setpoint value comparison, in order to in this way finally set in principle any value desired for the respective coefficient (within the framework of physics) and achieve it by means of linear, robust control algorithms plotted on a linear model.

The control system here does without heavy, moving parts, making it clearly faster than conventional, mechanical solutions, so that local flow phenomena can be suppressed or used in a targeted fashion.

As shown on FIG. 3, the aircraft can be controlled or a flight condition of the aircraft can be adjusted by means of the flow condition control device 60 fro the main wing M and/or by means of the flow condition control device 60K for the adjustment flap K, which receives an input signal 66 or 66K of the flight condition control device 70, from which, in a controller with the comparison device 65 or 65K, the input signal is compared with the flow condition actual value 62 or 62K as the sensor signal of the flow condition sensor device 17 or 17K of each segment to determine a flow condition adjustment command 61 or 61K for each segment 10 or 10K via a manipulated variable determination function 67 or 67K and the segment actuation function 68 or 68K, with which the flow condition to be adjusted is achieved by correspondingly actuating the flow-influencing devices 16 to 16K. As a result, it is provided in particular that:

A flow value related to the segment is determined as the actual value corresponding to the current local lift coefficient from the flow condition of a respective segment measured by the flow condition sensors;

A comparison value is determined from the setpoint flow value and actual flow value;

A setpoint command for the flow-influencing devices is determined from the comparison value for their actuation.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An aircraft, comprising:
   a respective arrangement of flow-influencing devices in at least one surface segment of each wing extending in the wingspan direction in order to influence the fluid flow over the surface segment, and of flow condition sensor devices for measuring the flow condition on the respective segment, and a flight control device,
   wherein the flight control device has a flow-influencing target parameter setting device connected with the arrangement of flow-influencing devices for generating target parameters for the flow-influencing devices of the at least one surface segment,
   wherein the flow-influencing target parameter setting device comprises an autopilot device that generates the target parameters based on a predetermined operating mode, and wherein the flow-influencing devices are designed in such a way as to use the target parameters to change the local lift coefficients or correlations between the drag and lift coefficients in the segment where respectively located.

2. The aircraft according to claim 1, wherein
the flight control device has a flight condition control device and a flow condition control device;
the flight condition control device is designed in such a way as to use the target parameters of the flow-influencing target parameter setting device and sensor signals of the flight condition sensor device to transmit input signals to the flow condition control device functionally connected with the flight control device;
the flow condition control device uses the input signals of the flight condition control device and sensor signals of the flow condition sensor device of each segment to generate flow condition adjustment commands for actuating the flow-influencing device of each segment, and transmits them to the flow-influencing device of each segment, in order to control the aircraft based on the target parameters of the flow-influencing target parameter setting device.

3. The aircraft according to claim 2, wherein the flight condition control device comprises a segment actuation function designed in such a way that the same generates one or more of adjustment commands for sending the same to the flow-influencing device of each segment adjustment commands for sending the same to an actuator of an adjusting flap for moving the same relative to the wing, wherein the generation of the adjustment commands is based on the adjustment signals of the flight condition control device by means of an optimization taking into account one or more of the power or dynamics of the flow-influencing device or of the actuator of the adjustment flap available at the time in question.

4. The aircraft according to claim 1, wherein the arrangement of flow-influencing devices comprises exhaust openings situated in one segment or several segments and a flow generating device for one or more of exhausting or sucking purposes situated in the wing, through which the fluid is blown out from the exhaust openings, so as to influence the lift coefficient arising locally on the segment.

5. The aircraft according to claim 4, wherein the arrangement of flow-influencing devices additionally comprises suction openings situated in one segment or several segments, and a suction device situated in the wing and connected in terms of flow with the suction openings, through which fluid is aspirated from the suction openings, so as to influence the lift coefficient arising locally on the segment.

6. The aircraft according to claim 1, wherein the arrangement of flow-influencing devices comprises loudspeaker devices, which are situated in one segment or several segments, and when activated can influence the lift coefficient arising locally on the segment by generating air fluctuations.

7. The aircraft according to claim 1, wherein the arrangement of flow-influencing devices comprises piezo-actuators situated on the surface of the wing, which are arranged in one segment or several segments, and when activated can influence the lift coefficient arising locally on the segment by generating air fluctuations.

8. The aircraft according to claim 7, wherein the arrangement of flow-influencing devices has an adjustment flap and an actuator for regulating the latter, wherein the target parameters for the flow-influencing devices comprise target parameters for the flow-generating device and target parameters for an actuator for regulating the adjustment flap.

9. The aircraft according to claim 1, wherein the at least one segment can comprise several segments, which are situated one in back of the other viewed in the wingspan direction of the wing.

* * * * *